(12) United States Patent
Kobayashi et al.

(10) Patent No.: US 10,843,409 B2
(45) Date of Patent: Nov. 24, 2020

(54) THREE-DIMENSIONAL OBJECT PRODUCTION APPARATUS

(71) Applicant: MIMAKI ENGINEERING CO., LTD., Nagano (JP)

(72) Inventors: Kosuke Kobayashi, Nagano (JP); Takuya Matsushima, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 400 days.

(21) Appl. No.: 15/819,114

(22) Filed: Nov. 21, 2017

(65) Prior Publication Data

US 2018/0147781 A1 May 31, 2018

(30) Foreign Application Priority Data

Nov. 28, 2016 (JP) .................................. 2016-229786

(51) Int. Cl.
| | |
|---|---|
| *B29C 64/227* | (2017.01) |
| *B33Y 30/00* | (2015.01) |
| *B29C 64/218* | (2017.01) |
| *B41J 2/01* | (2006.01) |
| *B29C 64/112* | (2017.01) |

(52) U.S. Cl.
CPC .......... *B29C 64/227* (2017.08); *B29C 64/218* (2017.08); *B33Y 30/00* (2014.12); *B29C 64/112* (2017.08); *B41J 2/01* (2013.01)

(58) Field of Classification Search
CPC ... B29C 64/227; B29C 64/218; B29C 64/112; B29C 64/40; B29C 64/209; B29C 64/245; B29C 64/386; B33Y 30/00; B33Y 50/02; B33Y 70/00
See application file for complete search history.

(56) References Cited

U.S. PATENT DOCUMENTS

| | | | | |
|---|---|---|---|---|
| 2001/0050448 | A1* | 12/2001 | Kubo .................... | B33Y 30/00 264/308 |
| 2010/0121476 | A1* | 5/2010 | Kritchman ........... | B29O 64/393 700/119 |
| 2017/0326800 | A1* | 11/2017 | Moore ................... | B33Y 30/00 |

* cited by examiner

*Primary Examiner* — Joseph S Del Sole
*Assistant Examiner* — Mohamed K Ahmed Ali
(74) *Attorney, Agent, or Firm* — Rankin, Hill & Clark LLP

(57) ABSTRACT

A three-dimensional object production apparatus includes a table, an ink-jet head, a flattening roller, a carriage, and a roller lifting-lowering mechanism. The ink-jet head is configured to eject ink droplets toward the table. The flattening roller is configured to flatten a surface of a layer of the ink. The carriage is configured to carry the ink-jet head and the flattening roller. The roller lifting-lowering mechanism is configured to lift and lower the flattening roller, and includes a roller holding member configured to rotatable hold the flattening roller, and a swing mechanism configured to cause the roller holding member to swing between a contact position and a retracted position. The flattening roller is able to contact the surface of the layer of the ink when the contact position is reached, and is retracted to be more on an upward side than the surface of the layer of the ink when the retracted position is reached.

20 Claims, 12 Drawing Sheets

THREE-DIMENSIONAL OBJECT PRODUCTION APPARATUS

CROSS-REFERENCE TO RELATED APPLICATIONS

The present application claims priority under 35 U.S.C. § 119 to Japanese Patent Application No. 2016-229786, filed Nov. 28, 2016. The contents of this application are incorporated herein by reference in their entirety.

BACKGROUND

Field of the Invention

The present disclosure relates to a three-dimensional object production apparatus for producing a three-dimensional object.

Discussion of the Background

JP2016-26915A1 discloses a three-dimensional object production apparatus for producing a three-dimensional object. The three-dimensional object production apparatus disclosed in JP2016-26915A1 includes: an ejection unit; a main scanning driving unit that causes the ejection unit to perform a main scanning operation; and a platform on which a three-dimensional object is formed. The ejection unit includes: a plurality of ink-jet heads that eject ink droplets toward the platform; a plurality of ultraviolet light sources; and a flattening roller unit. The flattening roller unit includes a flattening roller that flattens a layer of the ink ejected from the ink-jet head, so that a flat layer of ink with a predetermined thickness is obtained. The flattening roller unit is coupled to a drive mechanism that moves the flattening roller unit in an upward and downward direction relative to the entire positions of the ejection unit.

The three-dimensional object production apparatus disclosed in JP2016-26915A1 performs the flattening with the flattening roller unit during a main scanning operation with the ejection unit moving in a backward direction and does not perform the flattening during a main scanning operation with the ejection unit moving in a forward direction. The flattening roller unit is lowered to perform the flattening so that the flattening roller comes into contact with the surface of the ink layer to achieve a layer of ink with a predetermined thickness. The flattening roller is lifted when the flattening is not performed, so that the flattening roller does not come into contact with the surface of the layer of ink.

The contents of JP2016-26915A1 are incorporated herein by reference in their entirety.

The three-dimensional object production apparatus disclosed in JP2016-26915A1 has the flattening roller unit lifted and lowered each time the ejection unit moves back and forth in a main scanning direction. Thus, the three-dimensional object production apparatus involves frequent lifting and lowering operations of the flattening roller unit. Thus, the flattening roller unit is preferably lifted and lowered smoothly.

In light of the above circumstances, an object of the present disclosure is to provide a three-dimensional object production apparatus ensuring smooth lifting and lowering of a flattening roller for flattening a surface of a layer of ink ejected from an ink-jet head onto a table.

SUMMARY

According to one aspect of the present disclosure, a three-dimensional object production apparatus includes a table, an ink-jet head, a flattening roller, a carriage, and a roller lifting-lowering mechanism. A three-dimensional object is formed on the table. The ink-jet head is configured to eject ink droplets toward the table. The flattening roller is configured to flatten a surface of a layer of the ink ejected from the ink-jet head. The carriage is configured to carry the ink-jet head and the flattening roller. The roller lifting-lowering mechanism is carried on the carriage and configured to lift and lower the flattening roller toward and from the carriage. The roller lifting-lowering mechanism includes a roller holding member configured to rotatably hold the flattening roller, and a swing mechanism configured to cause the roller holding member to swing between a contact position and a retracted position. The flattening roller is able to contact the surface of the layer of the ink when the roller holding member is at the contact position, and is retracted to be more on an upward side than the surface of the layer of the ink when the roller holding member is at the retracted position.

In the three-dimensional object production apparatus according to the present disclosure, the roller lifting-lowering mechanism configured to lift and lower the flattening roller includes a roller holding member configured to rotatably hold the flattening roller, and a swing mechanism configured to cause the roller holding member to swing between a contact position and a retracted position. The flattening roller is able to contact the surface of the layer of the ink when the roller holding member is at the contact position, and is retracted to be more on an upward side than the surface of the layer of the ink when the roller holding member is at the retracted position. Thus, in the present disclosure, the swing mechanism causes the roller holding member to swing, whereby the flattening roller is lifted or lowered. The present disclosure ensures smoother lifting and lowering of the flattening roller compared with a configuration to lift and lower the flattening roller linearly in an upward and downward direction. In the present disclosure, the swing mechanism causes the roller holding member to swing, whereby the flattening roller is lifted or lowered. This enables high speed lifting and lowering of the flattening roller without compromising the smoothness of the lifting and lowering movement. Thus, in the present disclosure, the flattening roller can be smoothly lifted and lowered at high speed.

In the present disclosure, the swing mechanism may include an eccentric cam configured to cause the roller holding member to swing, and a motor configured to rotate the eccentric cam, for example. This configuration ensures higher responsiveness of the lifting and lowering operations of the flattening roller.

In the present disclosure, bearings are preferably attached to the roller holding member to support both side ends of the flattening roller. Thus, this configuration ensures no rattling between the roller holding member and the flattening roller. This ensures the flattening roller to be repeatedly positioned accurately at a lowered position, and ensures reduction or prevention of vibration of the flattening roller, with respect to the roller holding member, in the process of flattening the surface of the layer of the ink. This ensures accurate flattening of the surface of the layer of the ink by the flattening roller.

In the present disclosure, the three-dimensional object production apparatus preferably further includes a carriage drive mechanism configured to move the carriage in a main scanning direction that is one direction in a horizontal direction. The roller lifting-lowering mechanism preferably includes a support shaft configured to swingably support the roller holding member, and a holding frame configured to hold the support shaft. The support shaft is preferably disposed to have an axial direction matching a sub-scanning direction. The flattening roller is preferably disposed to have an axial direction matching the sub-scanning direction and is disposed at a position immediately below the support shaft when the roller holding member is at the contact position. In this configuration, the roller holding member is less likely to swing when upward counter force acts on the flattening roller flattening the surface of the ink layer. The roller holding member might be slightly displaced from the contact position while the surface of the ink layer is being flattened; however, the above-describe configuration ensures a smaller displacement amount of the position of the flattening roller in the upward and downward direction in such a situation.

In the present disclosure, the roller lifting-lowering mechanism preferably includes a stopper member configured to position the roller holding member at the contact position. This configuration ensures the flattening roller to be repeatedly positioned accurately at a lowered position. This ensures accurate flattening of the surface of the layer of the ink by the flattening roller.

In the present disclosure, the three-dimensional object production apparatus preferably further includes a carriage drive mechanism configured to move the carriage in a main scanning direction that is one direction in a horizontal direction. The roller lifting-lowering mechanism preferably includes a support shaft configured to swingably support the roller holding member, and a holding frame configured to hold the support shaft. The stopper member preferably includes a movable side stopper member secured to the roller holding member, and a fixed side stopper member secured to the holding frame. The support shaft is preferably disposed to have an axial direction matching a sub-scanning direction. The flattening roller is preferably disposed to have an axial direction matching the sub-scanning direction and is preferably disposed at a position more on a downward side than the support shaft. The movable side stopper member and the fixed side stopper member are preferably disposed more on an upward side than the support shaft. The roller holding member is preferably disposed at the contact position as a result of movement of the carriage toward a first direction side and is disposed at the retracted position as a result of movement of the carriage toward a second direction side, and the movable side stopper member is preferably in contact with the fixed side stopper member from the second direction side when the roller holding member is at the contact position. The first direction side is one side of the main scanning direction, and the second direction side is a side opposite to the first direction side. Thus, in this configuration, the movable side stopper member and the fixed side stopper member can receive counterforce acting on the second direction side of the flattening roller in the process of flattening the surface of the ink layer as a result of the movement of the carriage toward the right side. Thus, this configuration ensures a lower risk of displacement of the flattening roller in the process of flattening the surface of the ink layer in the main scanning direction. This ensures accurate flattening of the surface of the ink layer by the flattening roller.

In the present disclosure, the three-dimensional object production apparatus preferably further includes a carriage drive mechanism configured to move the carriage in a main scanning direction that is one direction in a horizontal direction, and an ultraviolet light emitter configured to cure ultraviolet curable ink ejected from the ink-jet head. The ultraviolet light emitter is preferably carried in the carriage while being adjacent to the flattening roller in a main scanning direction. The flattening roller preferably moves away from the ultraviolet light emitter when the roller holding member moves from the contact position to the retracted position. In this configuration, the ultraviolet light emitter emits ultraviolet light onto the ink on the table when the roller holding member is at the retracted position. This ensures that the ultraviolet light emitted from the ultraviolet light emitter is not blocked by the flattening roller disposed adjacent to the ultraviolet light emitter in the main scanning direction.

The three-dimensional object production apparatus according to the present disclosure described above ensures smooth lifting and lowering of the flattening roller for flattening the surface of the layer of ink ejected from the ink-jet head onto the table.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Embodiments of the present disclosure will now be described with reference to the accompanying drawings.

Schematic Configuration of Three-dimensional Object Production Apparatus

Figure 1:
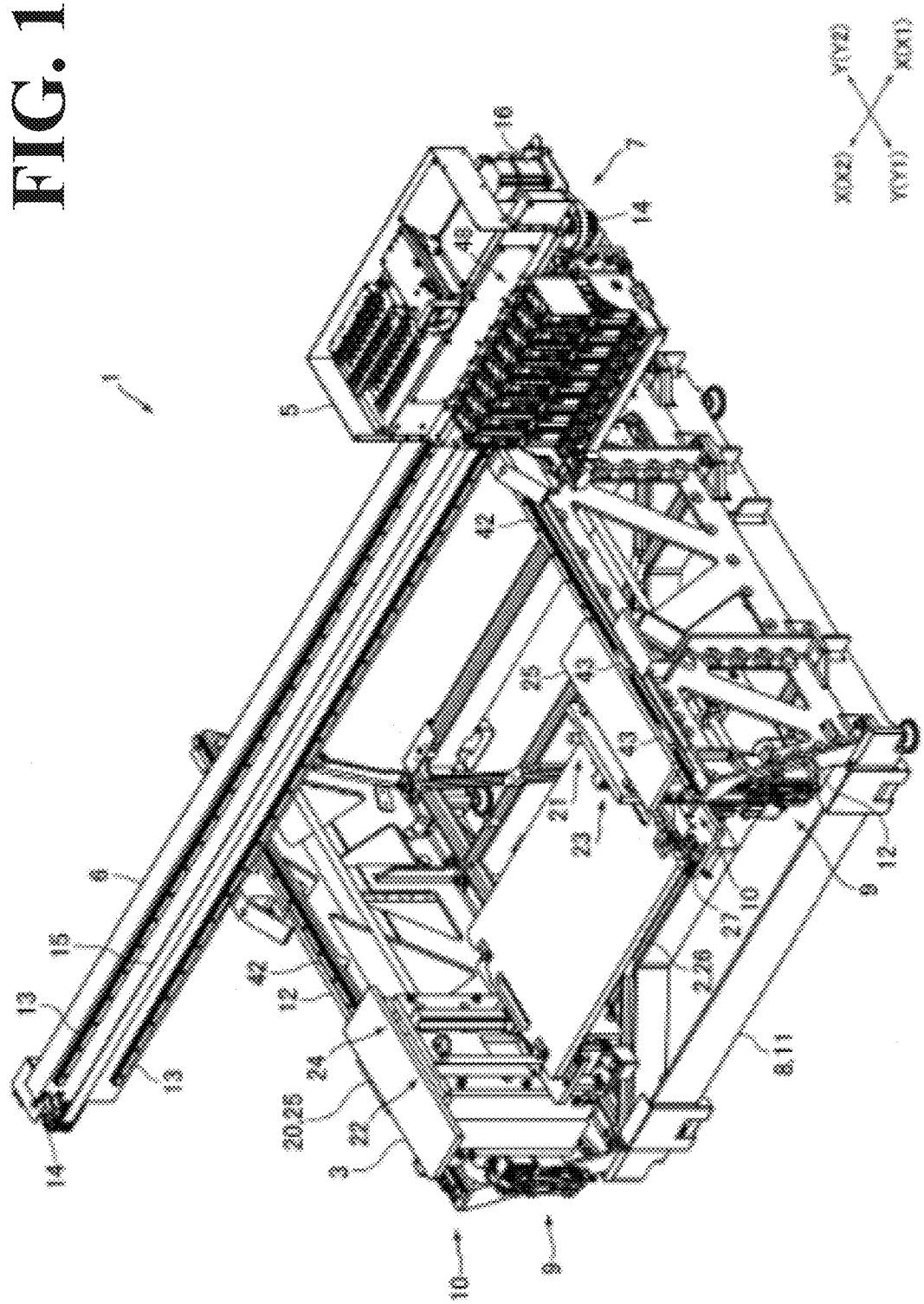
FIG. 1 is a perspective view of a three-dimensional object production apparatus according to an embodiment of the present disclosure.
Figure 2:
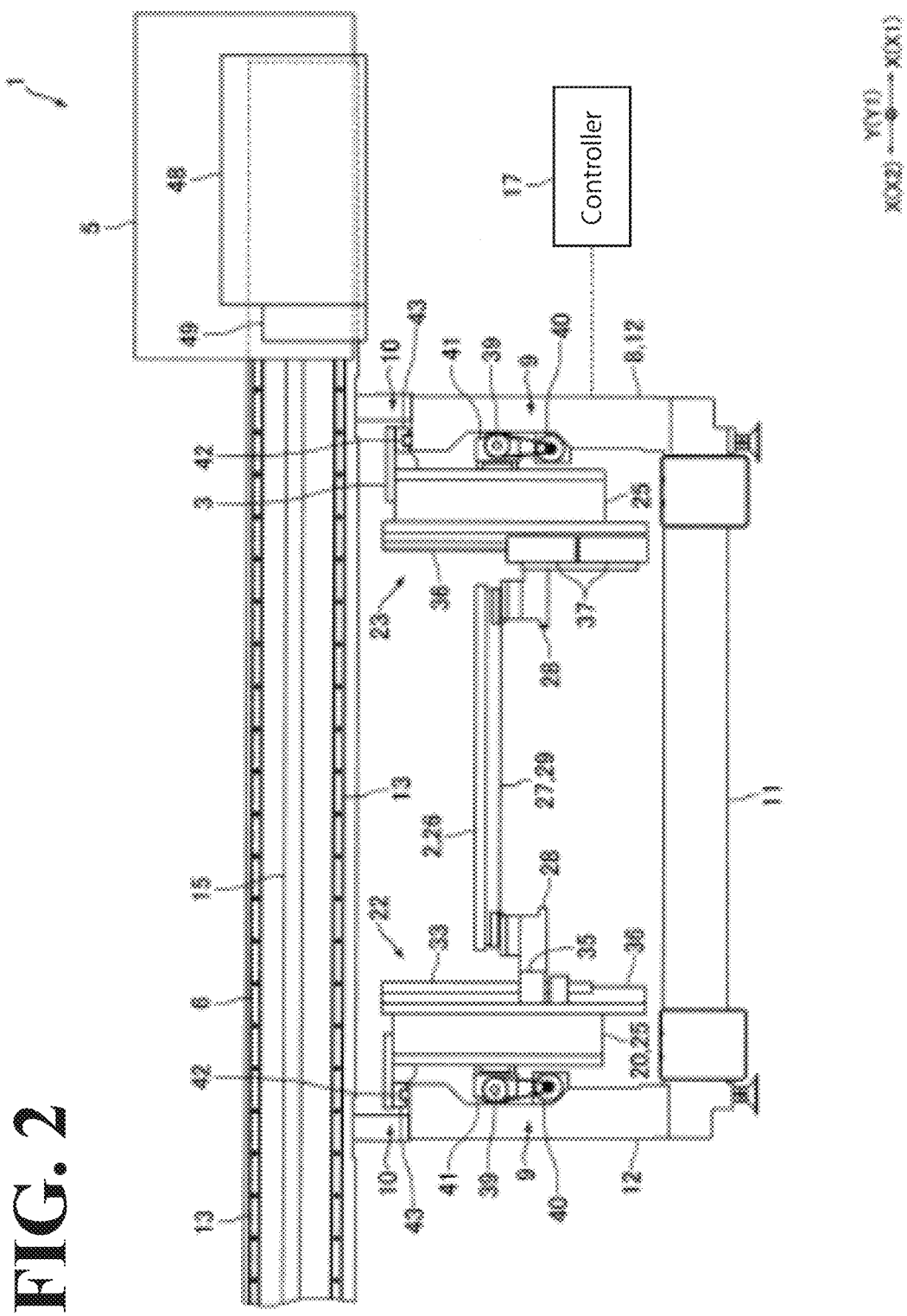
FIG. 2 is a schematic front view of the three-dimensional object production apparatus illustrated in FIG. 1.

FIG. 1 is a perspective view of a three-dimensional object production apparatus 1 according to an embodiment of the present disclosure. FIG. 2 is a schematic front view of the three-dimensional object production apparatus 1 illustrated in FIG. 1.

The three-dimensional object production apparatus 1 according to the present embodiment is a commercial ink-jet printer that produces a three-dimensional object. The three-dimensional object production apparatus 1 includes a stage 3 and a carriage 5. The stage 3 includes a table 2 on which a three-dimensional object is formed and placed. The carriage 5 that carries ink-jet heads 51 to 58, described later, configured to eject ink droplets toward the table 2.

The three-dimensional object production apparatus 1 further includes a supporting frame 6, a carriage drive mechanism 7, a body frame 8, a stage drive mechanism 9, and a guide mechanism 10. The carriage 5 is held by the supporting frame 6 while being movable in a main scanning direction, orthogonal to an upward and downward direction, by the carriage drive mechanism 7. The stage 3 is held by the body frame 8 while being movable in a sub-scanning direction, orthogonal to the main scanning direction, by the stage drive mechanism 9. The guide mechanism 10 guides the movement of the stage 3 in the sub-scanning direction. The three-dimensional object production apparatus 1 further includes a casing (not illustrated) that accommodates the components described above. The three-dimensional object production apparatus 1 further includes a controller 17 that controls the three-dimensional object production apparatus 1.

In the description below, the main scanning direction (X direction in figures such as FIG. 1) is referred to as "rightward and leftward direction". The sub-scanning direction (Y direction in figures such as FIG. 1) is referred to as "forward and rearward direction". One side (Y1 direction side) and the other side (Y2 direction side) in the forward and rearward direction are respectively referred to as "forward" side and "rear" side. One side (X1 direction side) and the other side (X2 direction side) in the rightward and leftward direction are respectively referred to as "right" side and "left" side. In the present embodiment, the right side (X1 direction side) and the left side (X2 direction side) respectively correspond to a first direction side and a second direction side opposite to the first direction side that are one and the other sides in the main scanning direction.

The body frame 8 includes a bottom surface member 11 and two side members 12, which stand upward from both left and right ends of the bottom surface member 11. The supporting frame 6 is formed to have a thin rectangular parallelepiped shape having the longitudinal direction matching the rightward and leftward direction. The supporting frame 6 is secured to the side members 12. The supporting frame 6 is disposed on the upward sides of rear end portions of the side members 12. The carriage 5 is supported by the supporting frame 6 to be disposed more on the upward side than the stage 3. Thus, the carriage 5 is disposed more on the upward side than the table 2.

The supporting frame 6 has a front surface where two guide rails 13, guiding the carriage 5 in the rightward and leftward direction, are secured. The guide rails 13 are secured to the supporting frame 6 in such a manner as to have the longitudinal direction matching the rightward and leftward direction. The two guide rails 13 are secured on the supporting frame 6 while being separated from each other by a predetermined distance in the upward and downward direction. The guide rails 13 engage with a guide block (not illustrated) secured to the carriage 5.

As illustrated in FIG. 1, the carriage drive mechanism 7 includes two pulleys 14, a belt 15 wound across the two pulleys 14, and a motor 16 that rotates the pulleys 14. The two pulleys 14 are supported by the supporting frame 6 to be capable of rotating about a rotational axis matching the upward and downward direction. The two pulleys 14 are respectively disposed on both right and left side ends of the supporting frame 6. The belt 15 is partially secured to the carriage 5. The motor 16 is attached to the right side end of the supporting frame 6. The motor 16 is coupled to the pulley 14 attached to the right side end of the supporting frame 6 via a predetermined power transmission mechanism. The motor 16 is driven to move the carriage 5 in the rightward and leftward direction along the guide rails 13.

Configuration of Stage

Figure 3:
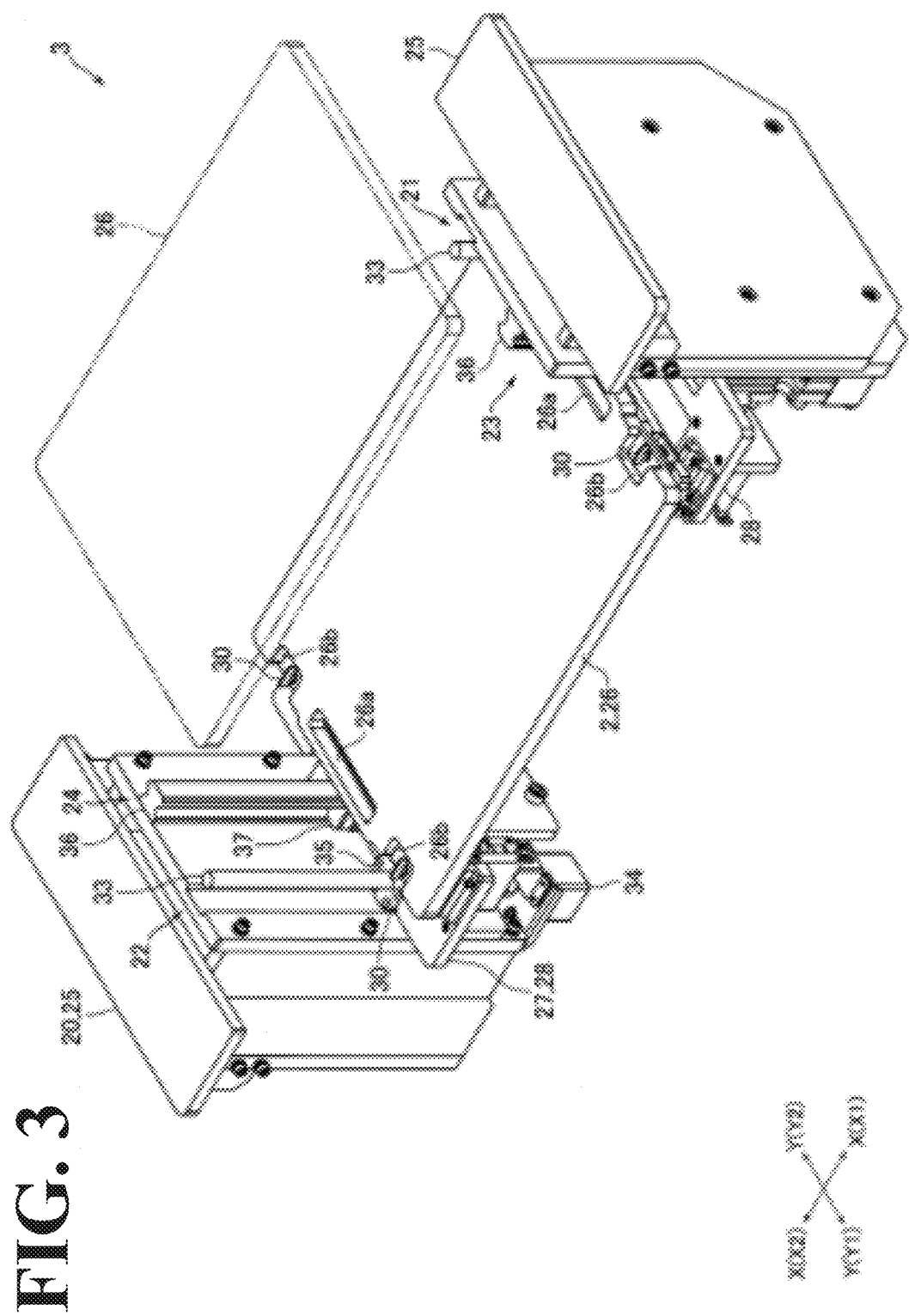
FIG. 3 is a perspective view of a stage illustrated in FIG. 1.
Figure 4:
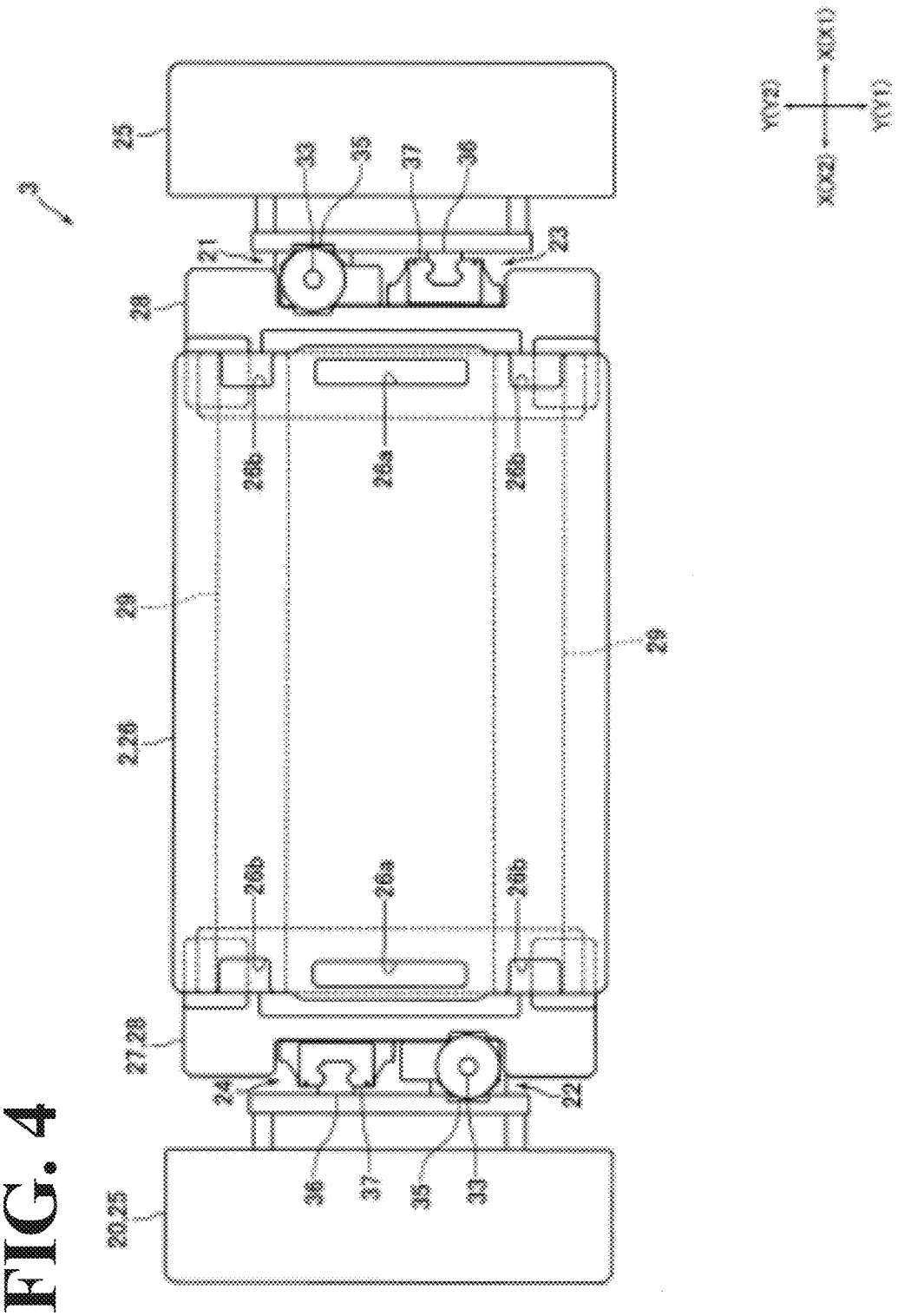
FIG. 4 is a schematic plan view of the stage illustrated in FIG. 1.

FIG. 3 is a perspective view of the stage 3 illustrated in FIG. 1. FIG. 4 is a schematic plan view of the stage 3 illustrated in FIG. 1.

The stage 3 is disposed between the two side members 12 in the rightward and leftward direction, and is also disposed more on the upward side than the bottom surface member 11. The stage 3, including the table 2, further includes a stage frame 20, two lifting-lowering mechanisms 21 and 22, and two guide mechanisms 23 and 24. The table 2 is supported by the stage frame 20 to be able to be lifted and lowered by the two lifting-lowering mechanisms 21 and 22. The two guide mechanisms 23 and 24 guide the table 2 in the upward and downward direction.

The stage frame 20 has right and left side surfaces defined by two side members 25 that are coupled to each other via, a coupling member (not illustrated). The table 2 is disposed between the two side members 25 in the rightward and leftward direction. The table 2 includes a platform 26 that has a shape of a flat rectangular plate and a platform holding member that holds the platform 26 while being supported by the stage frame 20 in such a manner as to be capable of being lifted and lowered. The platform 26 is detachably attached to the platform holding member 27. The platform holding member 27 includes two side members 28 that define both right and left end portions of the table 2 and two coupling members 29 (see FIG. 4) that couple the two side members 28 to each other.

The platform 26 has an upper surface approximately orthogonal to the upward and downward direction. A three-dimensional object is formed on the upper surface of the platform 26. The platform 26, having a rectangular shape, is disposed to have two parallel end surfaces, of four end surfaces, extending in parallel with the forward and rearward direction, and to have the remaining two end surfaces extending in parallel with the rightward and leftward direction. The platform 26 is made of aluminum alloy and has the upper surface anodized. A planer placement surface, orthogonal to the upward and downward direction, is formed on the upper surface of the side member 28. Both right and left side end portions of the platform 26 are placed on the placement surface.

The platform 26 placed on the placement surface is secured to the platform holding member 27 with screws 30 (see FIG. 3). For example, the screws 30 are provided on both ends on the forward and the rear sides and on the right and the left sides of the platform 26. When the screws 30 are removed, the platform 26 can be moved toward the upward side to be detached from the platform holding member 27 as illustrated with a two-dotted chain line in FIG. 3. The platform 26 has both right and left side ends provided with through holes 26a so that the platform 26 can be grabbed to be detached from the platform holding member 27. The platform 26 has recesses 26b, for receiving heads of the screws 30, formed with both ends on the right and left sides of the upper surface recessed. The screws 30 are omitted in FIG. 4.

The lifting-lowering mechanisms 21 and 22 include: lead screws 33 rotatably supported by the stage frame 20; motors 34 (see FIG. 3) that rotate the lead screws 33; and nut members 35 that are attached to the table 2 to engage with the lead screws 33. The two lifting-lowering mechanisms 21 and 22 can be driven independently from each other. The guide mechanisms 23 and 24 each include: a guide rail 36 attached to the stage frame 20; and a guide block 37 attached to the table 2 to engage with the guide rail 36. The guide mechanisms 23 and 24 according to the present embodiment are each formed as a Linear Motion (LM) guide (registered trademark) with a ball retainer incorporated in the guide block 37.

As illustrated in FIG. 4, the lifting-lowering mechanism 21 and the guide mechanism 23 are provided at the right side end of the table 2. The lifting-lowering mechanism 21 and the guide mechanism 23 are arranged along the forward and rearward direction. The lifting-lowering mechanism 21 and the guide mechanism 23 are adjacently arranged in an approximately center portion of the table 2 in the forward and rearward direction. In the present embodiment, the lifting-lowering mechanism 21 is disposed more on the rear side than the guide mechanism 23. The lifting-lowering mechanism 22 and the guide mechanism 24 are provided at the left side end of the table 2. The lifting-lowering mechanism 22 and the guide mechanism 24 are arranged along the forward and rearward direction. The lifting-lowering mechanism 22 and the guide mechanism 24 are adjacently arranged in an approximately center portion of the table 2 in the forward and rearward direction. In the present embodiment, the guide mechanism 24 is disposed more on the rear side than the lifting-lowering mechanism 22.

The distance between the lifting-lowering mechanism 21 and the guide mechanism 23 in the forward and rearward direction is the same as that between the lifting-lowering mechanism 22 and the guide mechanism 24 in the forward and rearward direction. Specifically, the distance between the center of the lead screw 33 of the lifting-lowering mechanism 21 and the center of the guide rail 36 of the guide mechanism 23 in the forward and rearward direction is the same as that between the center of the lead screw 33 of the lifting-lowering mechanism 22 and the center of the guide rail 36 of the guide mechanism 24 in the forward and rearward direction. The lifting-lowering mechanism 21 is disposed slightly more on the rear side than the guide mechanism 24 in the forward and rearward direction. The guide mechanism 23 is disposed slightly more on the rear side than the lifting-lowering mechanism 22 in the forward and rearward direction.

The lead screws 33 are rotatably supported by inner side surfaces of the two side members 25 in the rightward and leftward direction in such a manner as to have the axial direction matching the upward and downward direction. The motors 34 are each secured to a downward side end of a corresponding one of the two side members 25. The motor 34 has an output shaft coupled to a downward end portion of the lead screw 33. The nut members 35 are attached to outer side surfaces of the two side members 28 in the rightward and leftward direction. The guide rails 36 are secured to the inner side surfaces of the two side members 25 in the rightward and leftward direction, in such a manner as to have the longitudinal direction matching the upward and downward direction. The guide blocks 37 are attached to the outer side surfaces of the two side members 28 in the rightward and leftward direction.

Configurations of Stage Drive Mechanism and Guide Mechanism

The stage drive mechanisms 9 and the guide mechanisms 10 are provided on both sides of the stage 3 in the rightward and leftward direction. The stage drive mechanisms 9 each include: a lead screw 39 rotatably supported by the side member 12; a motor 40 that rotates the lead screw 39; and a nut member 41 attached to the stage 3 to engage with the lead screw 39. The guide mechanisms 10 each include: a guide rail 42 secured to the side member 12; and a guide block 43 attached to the stage 3 to engage with the guide rail 42.

The lead screws 39 are rotatably supported by the inner side surfaces of the two side members 12 in the rightward and leftward direction, to have the axial direction matching the forward and rearward direction. The motors 40 are each secured to a corresponding one of the inner side surfaces of the two side members 12 in the rightward and leftward direction. The motors 40 are each secured to a forward side end portion of a corresponding one of the side members 12. Output shafts of the motors 40 are each coupled to a forward end portion of a corresponding one of the lead screw 39 via a pulley and a belt. The nut members 41 are attached to outer side surfaces of the two side members 25 in the rightward and leftward direction to be attached to the stage frames 20 moved by the stage drive mechanisms 9 in the forward and rearward direction.

The guide rails 42 are each secured to an upward end surface of a corresponding one of the side members 12 in such manner as to have the longitudinal direction matching the forward and rearward direction. The guide blocks 43 are each secured on an upward side end of the side member 25 of a corresponding one of the stage frames 20. The guide blocks 43 engage with the guide rails 42 from the upward side.

In the present embodiment, the stage 3 can be moved forward to a position to be disposed more on the forward side than the carriage 5 as illustrated in FIG. 1. Thus, in the present embodiment, the table 2 can be moved forward to a position to be disposed more on the forward side than the carriage 5. The stage drive mechanisms 9 move the table 2 in the forward and rearward direction during a process of forming a three-dimensional object, and move the table 2 to the forward end when the three-dimensional object that has been formed is to be taken out from the three-dimensional object production apparatus 1. Specifically, the stage 2 is moved by the stage drive mechanisms 9 to protrude forward from the three-dimensional object production apparatus 1 when the three-dimensional object is to be taken out from the three-dimensional object production apparatus 1. The three-dimensional object is taken out through an opening formed in the casing of the three-dimensional object production apparatus 1.

Configuration of Carriage

Figure 5:
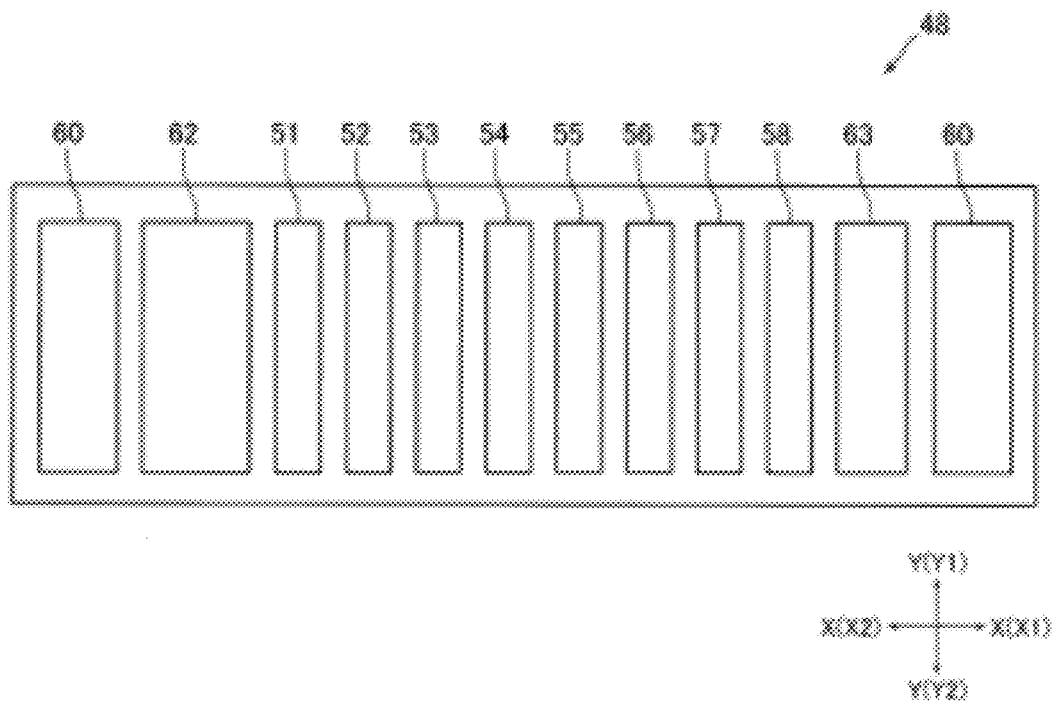
FIG. 5 is a bottom view illustrating a configuration of an ejection unit carried in a carriage illustrated in FIG. 1.
Figure 6:
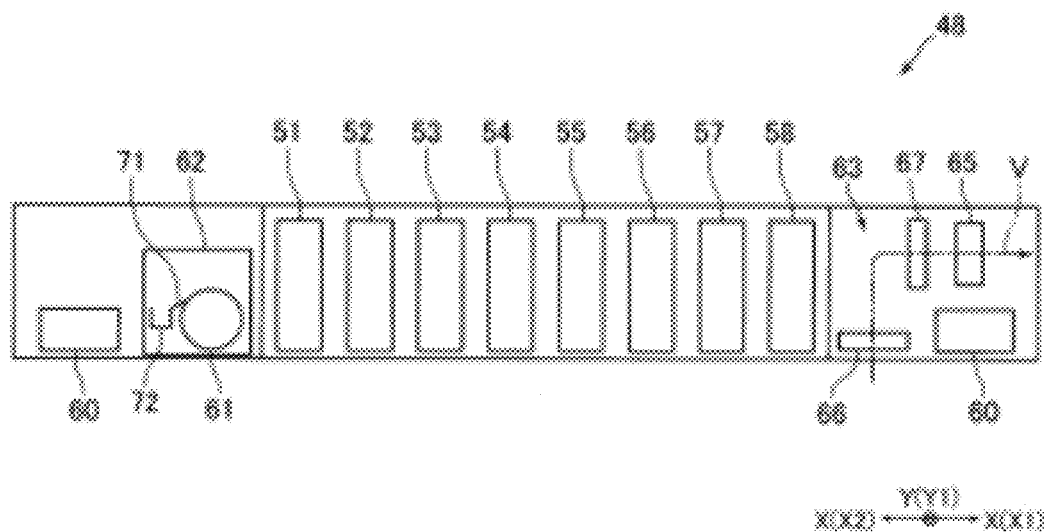
FIG. 6 is a front view illustrating a configuration of the ejection unit illustrated in FIG. 5.
Figure 7:
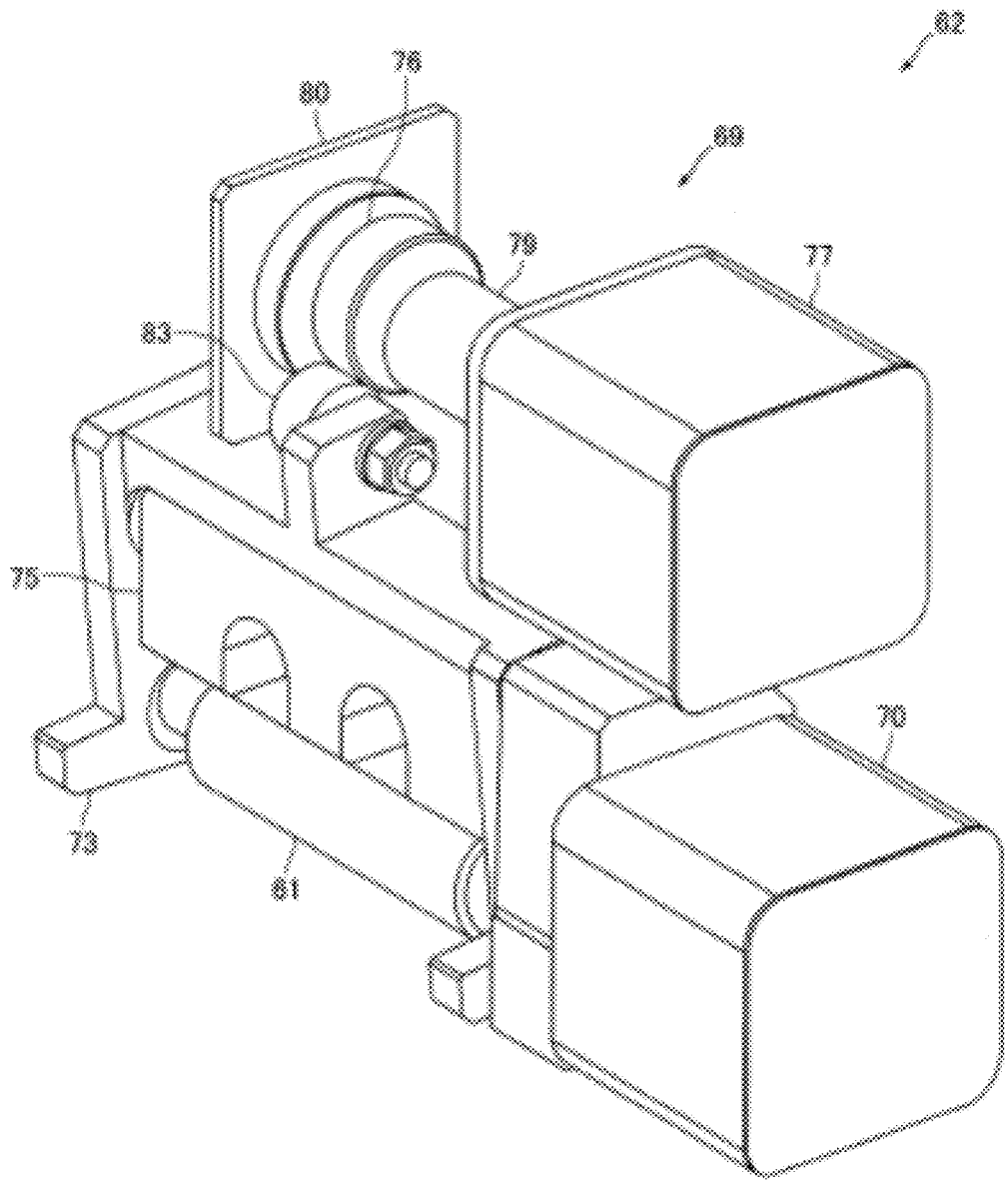
FIG. 7 is a perspective view illustrating a part of a flattening roller unit illustrated in FIG. 5.
Figure 8A:
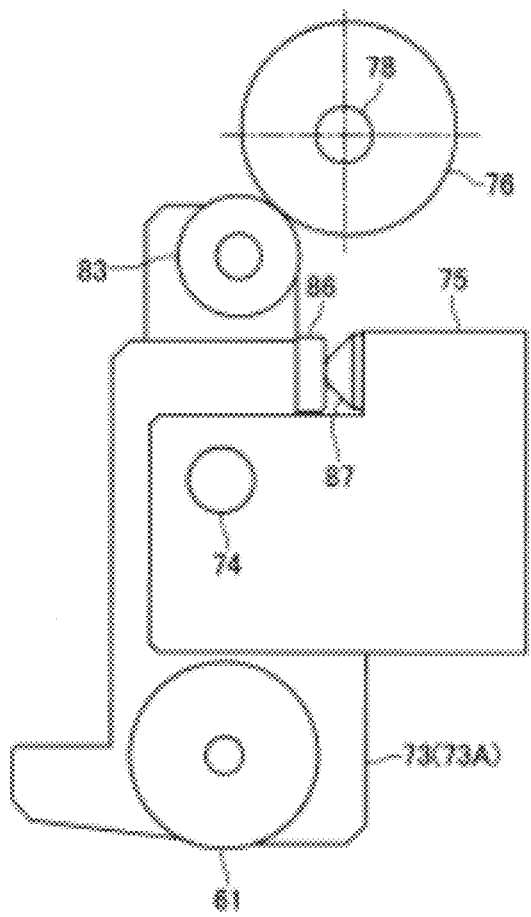
FIGS. 8A and 8B are front views illustrating a configuration and an operation of the flattening roller unit illustrated in FIG. 7.
Figure 8B:
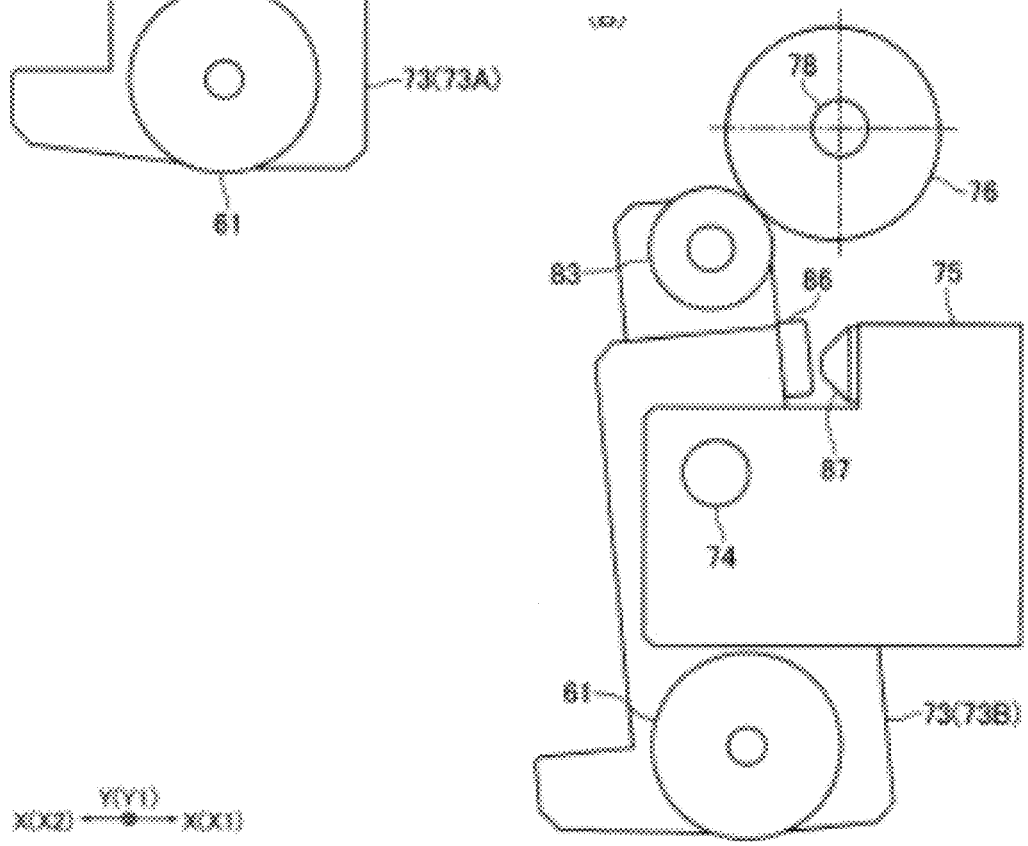
Figure 9:
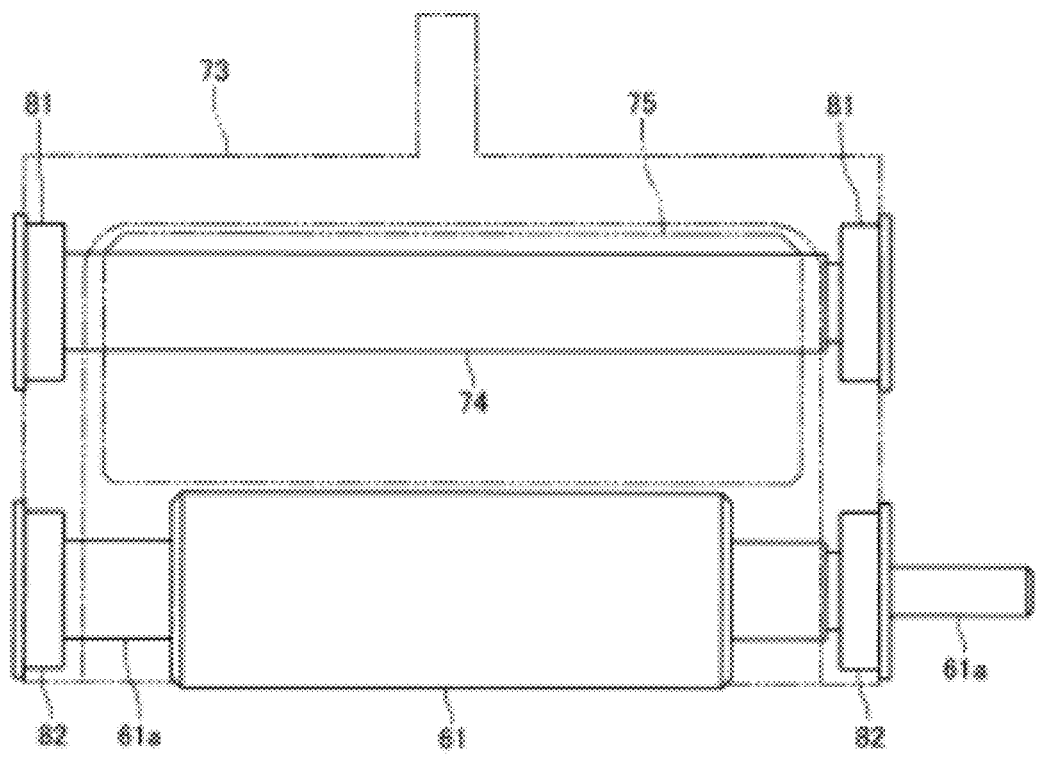
FIG. 9 is a side view illustrating configurations of a supporting portion for a flattening roller and a supporting portion for a roller holding member illustrated in FIG. 7.

FIG. 5 is a bottom view illustrating a configuration of an ejection unit 48 carried by the carriage 5 illustrated in FIG. 1. FIG. 6 is a front view illustrating a configuration of the ejection unit 48 illustrated in FIG. 5. FIG. 7 is a perspective view illustrating one part of a flattening roller unit 62 illustrated in FIG. 5. FIGS. 8A and 8B are front views illustrating a configuration and an operation of the flattening roller unit 62 illustrated in FIG. 7. FIG. 9 is a side view illustrating configurations of supporting portions for a flattening roller 61 and a roller holding member 73 illustrated in FIG. 7.

The carriage 5 carries the ejection unit 48 for forming a three-dimensional object. The carriage 5 also carries a laser range finder 49 (see FIG. 2). The ejection unit 48 includes the ink-jet heads 51 to 58 that eject ink droplets toward the table 2. Specifically, the ejection unit 48 according to the present embodiment includes eight ink-jet heads 51 to 58 that are arranged to eject ink droplets downward. The ink ejected from the inkjet heads 51 to 58 is ultraviolet curable ink.

The ejection unit 48 further includes an ultraviolet light emitter 60 that emits ultraviolet light to the ultraviolet curable ink ejected from the ink-jet heads 51 to 58 onto the table 2, to cure the ink. The ejection unit 48 according to the present embodiment includes two ultraviolet light emitters 60. The ejection unit 48 further includes the flattening roller unit 62 and an ink mist absorbing mechanism 63. The flattening roller unit 62 includes the flattening roller 61 that flattens a surface (upper surface) of a layer of ink ejected onto the table 2 from the ink-jet heads 51 to 58. The ink mist absorbing mechanism 63 absorbs ink mist produced when the ink-jet heads 51 to 58 eject the ink.

As described above, the carriage 5 carries the eight ink-jet heads 51 to 58, the two ultraviolet light emitters 60, the flattening roller unit 62, and the ink mist absorbing mechanism 63 that are the components of the ejection unit 48. Specifically, the carriage 5 carries the ultraviolet light emitter 60, the flattening roller unit 62, the ink-jet head 51, the ink-jet head 52, the ink-jet head 53, the ink-jet head 54, the ink-jet head 55, the ink-jet head 56, the ink-jet head 57, the ink-jet head 58, and the ultraviolet light emitter 60 that are arranged in this order from the left side to the right side. The ink mist absorbing mechanism 63 is disposed between the ultraviolet light emitter 60 disposed at the right end and the ink-jet head 58, and disposed on the upward side of the ultraviolet light emitter 60 disposed at the right end.

The ink-jet heads 51 and 58 are support material heads that eject ink serving as a support material for supporting the three-dimensional object. The ink-jet head 52 is a build-material head that ejects ink serving as a build material. The ink-jet head 53 is a clear-ink head that ejects transparent ink (clear ink). The ink-jet heads 54 to 57 are color-ink heads that eject color ink. In the present embodiment, the ink-jet head 54 ejects ink of a yellow color, the ink-jet head 55 ejects ink of a cyan color, the ink-jet head 56 ejects ink of a magenta color, and the ink-jet head 57 ejects ink of a black color.

The ultraviolet light emitter 60 includes an ultraviolet light emitting diode (UVLED), a metal halide lamp, a mercury lamp, and the like, and emits ultraviolet light downward. The ultraviolet light emitter 60 according to the present embodiment is a UVLED.

The ink mist absorbing mechanism 63 includes: a suction fan 65 that sucks the ink mist; and two filters 66 and 67 disposed along a path of the ink mist sucked by the suction fan 65 (see FIG. 6). The suction fan 65 is disposed on the upward side of the ultraviolet light emitter 60 disposed at the right end. The filter 66 is disposed between the ultraviolet light emitter 60 disposed at the right end and the ink-jet head 58, and the filter 67 is disposed on the left side of the suction fan 65. A suction port for air including the ink mist is formed on the downward side of the filter 66, and a discharge port is formed on the right side of the suction fan 65. In the ink mist absorbing mechanism 63, when the suction fan 65 is driven, the air including the ink mist, sucked in through the suction port on the downward side of the filter 66, passes through the filter 66 and the filter 67 in this order and is then discharged through the discharge port on the right side of the suction fan 65, as indicated by an arrow V in FIG. 6.

The flattening roller unit 62 includes: a roller lifting-lowering mechanism 69 (see FIG. 7) that lifts and lowers the flattening roller 61 toward and from the carriage 5; and a motor 70 that rotates the flattening roller 61. The flattening roller unit 62 includes a blade 71 and an ink collecting unit 72. The blade 71 removes ink attached to a surface of the flattening roller 61 as a result of the process of flattening the surface of the layer of the ink ejected onto the table 2. The ink removed from the surface of the flattening roller 61 by the blade 71 is collected in the ink collecting unit 72 (see FIG. 6).

The roller lifting-lowering mechanism 69 is carried by the carriage 5. The roller lifting-lowering mechanism 69 includes: the roller holding member 73 that rotatably holds the flattening roller 61; a support shaft 74 that swingably supports the roller holding member 73; a holding frame 75 that holds the support shaft 74; an eccentric cam 76 for making the roller holding member 73 swing relative to the holding frame 75; and a motor 77 that rotates the eccentric cam 76. The roller lifting-lowering mechanism 69 further includes a rotational shaft 78 (see FIGS. 8A and 8B). The eccentric cam 76 is secured to the rotational shaft 78. The holding frame 75 and the motor 77 are secured to the carriage 5. In the present embodiment, the eccentric cam 76 and the motor 77 form a swing mechanism that makes the roller holding member 73 swing.

The rotational shaft 78 is disposed in such a manner as to have the axial direction matching the forward and rearward direction. The rotational shaft 78 has one end (forward end) coupled to an output shaft of the motor 77 via a coupling 79 (see FIG. 7) and has the other end (rear side end) rotatably supported by a support member 80. The support member 80 is secured to the holding frame 75. The eccentric cam 76 is formed to have a disk shape. The eccentric cam 76 is secured to the rotational shaft 78 with the axial center shifted from that of the eccentric cam 76.

The support shaft 74 is disposed in such a manner as to have the axial direction matching the forward and rearward direction. The support shaft 74 is secured to the holding frame 75. The support shaft 74 has both side ends protruding beyond the holding frame 75 in the forward and rearward direction. As illustrated in FIG. 9, two bearings 81 are attached to the roller holding member 73 to support both side ends of the support shaft 74, so that the roller holding member 73 can swing about a swing axis in the forward and rearward direction, relative to the holding frame 75. The bearing 81 is a rolling bearing.

The flattening roller 61 is disposed in such a manner as to have the axial direction matching the forward and rearward direction. The flattening roller 61 is disposed more on the downward side than the support shaft 74. As described above, the flattening roller unit 62 is disposed on the right side of the ultraviolet light emitter 60 disposed at the left end of the ejection unit 48. The flattening roller 61 is disposed adjacent to the ultraviolet light emitter 60 disposed at the left end of the ejection unit 48 in the rightward and leftward direction. Thus, the ultraviolet light emitter 60 disposed at the left end of the ejection unit 48 is carried by the carriage 5 while being disposed adjacent to the flattening roller 61 in the rightward and leftward direction.

Two bearings 82 are attached to the roller holding member 73 to support supporting portions 61a formed on both side ends of the flattening roller 61 as illustrated in FIG. 9, so that the flattening roller 61 can rotate about the rotational axis in the forward and rearward direction, relative to the roller holding member 73. The bearing 82 is a rolling bearing. The motor 70, the blade 71, and the ink collecting unit 72 are secured to the roller holding member 73, and swing together with the flattening roller 61 and the roller holding member 73 relative to the holding frame 75. The motor 70 has an output shaft coupled to the flattening roller 61 via a gear (not illustrated).

A cam follower 83, in a form of a roller, is rotatably attached to an upward side end of the roller holding member 73 and comes into contact with the eccentric cam 76. The cam follower 83 is attached to the roller holding member 73 to be rotatable about the rotational axis in the forward and rearward direction. The cam follower 83 is disposed more on the upward side than the support shaft 74. Specifically, the cam follower 83 is disposed at a position approximately above the support shaft 74. The cam follower 83 is disposed on a left downward side of the eccentric cam 76 and is in contact with a left downward side portion of the eccentric cam 76. The cam follower 83 is in contact with the eccentric cam 76, with the roller holding member 73 biased in a clockwise direction about the support shaft 74 in FIGS. 8A and 8B by a spring member (not illustrated).

When the eccentric cam 76 rotates, the flattening roller 61 swings between a contact position (position illustrated in FIG. 8A) 73A and a retracted position (position illustrated in FIG. 8B) 73B, about the support shaft 74. The flattening roller 61 can be in contact with the surface (upper surface) of the layer of ink when the roller holding member 73 is at the contact position 73A. The flattening roller 61 is retracted to be more on the upward side than the surface of the layer of ink when the roller holding member 73 is at the retracted position 73B. In this manner, the eccentric cam 76 causes the roller holding member 73 to swing between the contact position 73A and the retracted position 73B. For example, a lifted lowered amount of the flattening roller 61 (that is, a difference between the height of the flattening roller 61 when the roller holding member 73 is at the contact position 73A and the height of the flattening roller 61 when the roller holding member 73 is at the retracted position 73B) is approximately 0.1 mm to 0.3 mm. The flattening roller 61 is disposed at a position immediately below the support shaft 74 when the roller holding member 73 is at the contact position 73A.

In the present embodiment, the roller holding member 73 at the retracted position 73B moves left downward toward the contact position 73A, due to the rotation of the eccentric cam 76. The roller holding member 73 at the contact position 73A moves right upward toward the retracted position 73B, due to the rotation of the eccentric cam 76. The flattening roller 61 is disposed on the right side of the ultraviolet light emitter 60 disposed at the left end of the ejection unit 48, and thus moves away from the ultraviolet light emitter 60 disposed at the left end of the ejection unit 48 when the roller holding member 73 moves from the contact position 73A to the retracted position 73B. Thus, the flattening roller 61 is positioned farther from the ultraviolet light emitter 60 disposed at the left end of the ejection unit 48 in the state where the roller holding member 73 is at the retracted position 73B than in the state where the roller holding member 73 is at the contact position 73A.

As illustrated in FIGS. 8A and 8B, the roller lifting-lowering mechanism 69 includes stopper members 86 and 87 that stop the roller holding member 73 at the contact position 73A. The stopper members 86 and 87 are disposed more on the upward side than the support shaft 74. Specifically, the stopper members 86 and 87 are disposed on a right upward side of the support shaft 74. The stopper members 86 and 87 are disposed more on the downward side than the cam follower 83. The stopper member 86 is secured to the roller holding member 73 and the stopper member 87 is secured to the holding frame 75. The stopper member 86 is disposed on the left side of the stopper member 87, and is in contact with the left side of the stopper member 87 when the roller holding member 73 is at the contact position 73A. The stopper member 86 and the stopper member 87 according to the present embodiment respectively serve as a movable side stopper member and a fixed side stopper member.

For example, the laser range finder 49 is disposed at a position adjacent to the ejection unit 48 in the rightward and leftward direction, and emits a laser beam toward the downward side. The laser range finder 49 measures a distance between the upper surface of the table 2 and the laser range finder 49 in the upward and downward direction. Thus, the laser range finder 49 measures a distance between the upper surface of the platform 26 and the laser range finder 49 in the upward and downward direction. The laser range finder 49 also measures distances between the laser range finder 49 and a plurality of portions of an upper surface of the three-dimensional object being formed in the upward and downward direction for example, so that a shape of the three-dimensional object being formed can be detected.

In the present embodiment, the following process is performed before the process of producing a three-dimensional object starts. Specifically, the carriage 5 moves in the rightward and leftward direction, the table 2 moves in the forward and rearward direction, and then the laser range finder 49 measures distances between the laser range finder 49 and a plurality of positions on the upper surface of the table 2 in the upward and downward direction. For example, the laser range finder 49 measures a distance between the laser range finder 49 and each of four portions of the upper surface of the table 2 in the upward and downward direction. The lifting-lowering mechanisms 21 and 22 lift and lower the table 2, based on the result of the measurement by the laser range finder 49, to set the height of the upper surface of the table 2 (the height of the upper surface of the platform 26) at the point when the process for forming the three-dimensional object starts. Specifically, the lifting-lowering mechanisms 21 and 22 lift or lower the table 2 to make a portion of the upper surface of the table 2 closest to the laser range finder 49 (the highest portion of the upper surface of the table 2) disposed slightly more on the downward side than a downward end of the flattening roller 61 in the state where the roller holding member 73 is at the contact position 73A. Thus, the height of the upper surface of the table 2 at the point when the process for forming the three-dimensional object starts is set.

In the present embodiment, a three-dimensional object is formed with the controller 17 of the three-dimensional object production apparatus 1 comparing design data on the three-dimensional object with the shape of the three-dimensional object being formed recognized based on the result of the detection using the laser range finder 49. The controller 17 maintains the operation of the three-dimensional object production apparatus 1 so that the process of forming the three-dimensional object continues, as long as the three-dimensional object being formed conforms to the design data, and stops the three-dimensional object production apparatus 1 when the three-dimensional object being formed does not conform to the design data.

As described above, the carriage 5 moves in the rightward and leftward direction along the guide rails 13. In the present embodiment, a home position of the carriage 5 is a position of the carriage 5 at the right side end of the guide rail 13. The three-dimensional object production apparatus 1 performs the process for forming the three-dimensional object, with the ink-jet heads 51 to 58 ejecting ink droplets while the carriage 5 is moving toward the left side from the home position. During this process, the roller holding member 73 is at the retracted position 73B.

When the carriage 5 that has moved to the left side end makes a returning movement toward the right side, the roller holding member 73 moves to the contact position 73A, whereby the flattening roller 61 flattens the surface of the layer of ink. Thus, the roller holding member 73 is disposed at the contact position 73A when the carriage 5 moves toward the right side. The flattening roller 61 rotates in a counterclockwise direction in FIG. 6 and FIG. 8 to flatten the surface of the layer of ink. The flattening roller unit 62 may have a lock mechanism that locks the flattening roller 61 when the carriage 5 is at the home position.

Configurations of Ink Circulation Mechanism and Ink Collection Mechanism

Figure 10:
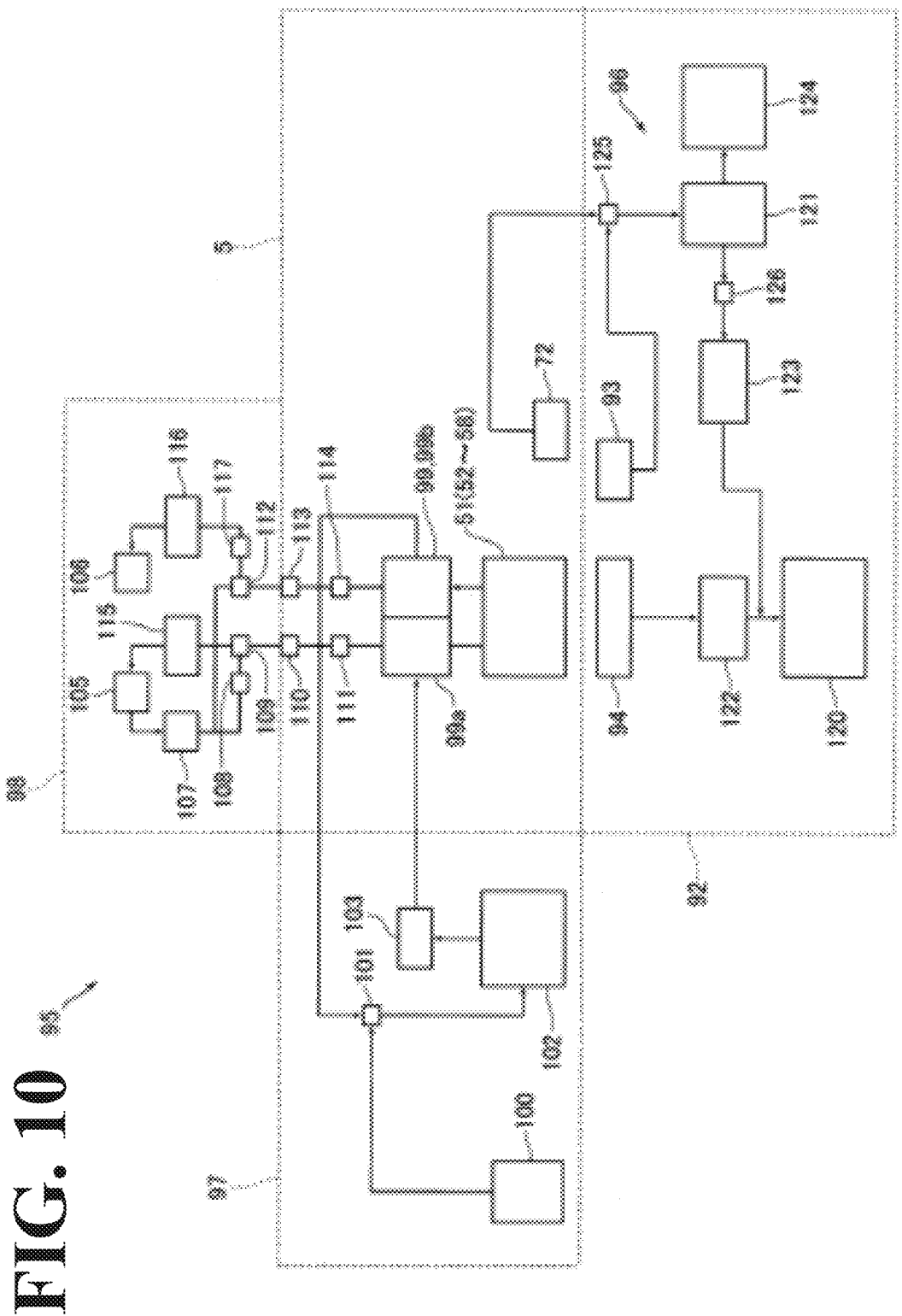
FIG. 10 is a block diagram illustrating configurations of an ink circulation mechanism and an ink collection mechanism of the three-dimensional object production apparatus illustrated in FIG. 1.
Figure 11:
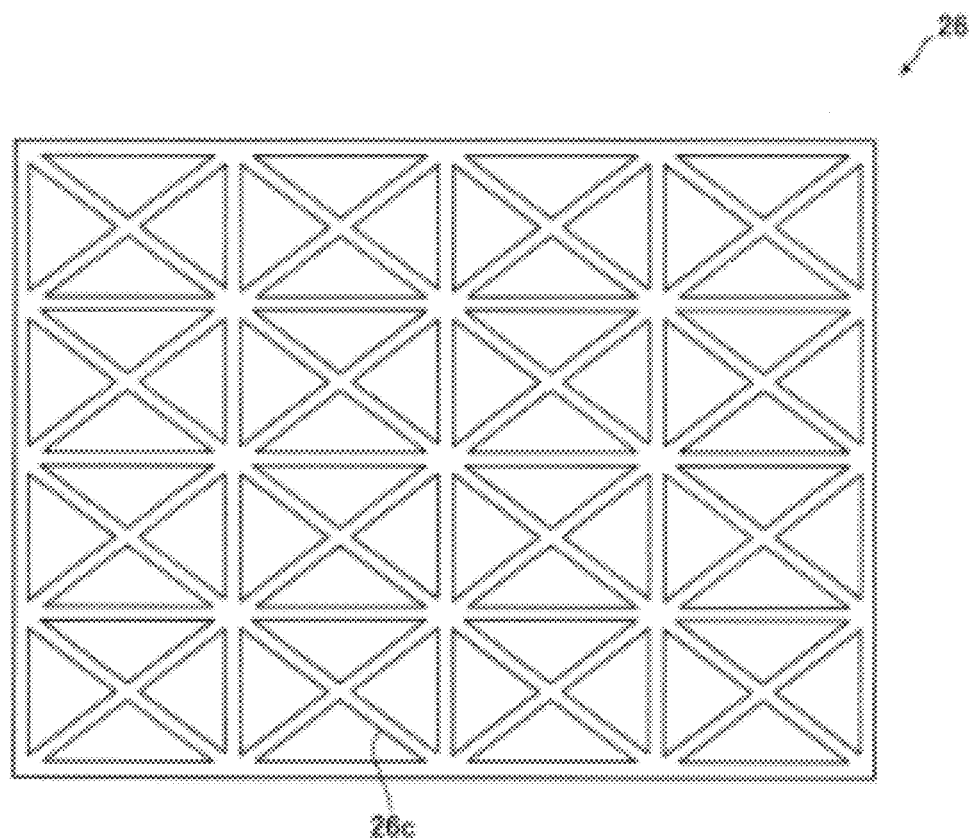
FIG. 11 is a bottom view of a platform according to an alternative embodiment of the present disclosure.

FIG. 10 is a block diagram illustrating configurations of an ink circulation mechanism 95 and an ink collection mechanism 96 of the three-dimensional object production apparatus 1 illustrated in FIG. 1.

The three-dimensional object production apparatus 1 includes a maintenance unit 92 for preventing a nozzle of the ink-jet heads 51 to 58 from clogging. The maintenance unit 92 includes a wiper, an ink collecting unit 93, and a cap 94. The wiper wipes off ink attached to a nozzle surface of the ink-jet heads 51 to 58. The ink collecting unit 93 collects the ink thus wiped off by the wiper. The cap 94 has a suction mechanism that sucks ink in the nozzle of the ink-jet heads 51 to 58. For example, the maintenance unit 92 is disposed on the downward side of the carriage 5 at the home position. The cap 94 may not include the suction mechanism. In such a configuration, the ink-jet heads 51 to 58 under maintenance eject ink droplets toward the cap 94.

The three-dimensional object production apparatus 1 according to the present embodiment includes the ink circulation mechanism 95 and the ink collection mechanism 96. The ink circulation mechanism 95 circulates ink in the ink-jet heads 51 to 58. The ink collected by the ink collecting units 72 and 93 and the ink sucked by the cap 94 are collected in the ink collection mechanism 96.

The ink circulation mechanism 95 includes: an ink supply unit 97 that supplies ink to the ink-jet heads 51 to 58; an air controller 98 that controls air pressure for circulating the ink; and sub-tanks 99 carried by the carriage 5. The sub-tanks 99 are each connected to a corresponding one of the eight ink-jet heads 51 to 58. Thus, the ink circulation mechanism 95 includes eight sub-tanks 99. The sub-tanks 99 each include an upstream-side liquid chamber 99a and a downstream-side liquid chamber 99b. The liquid chambers 99a have discharge sides connected to inlet sides of the ink-jet heads 51 to 58. The liquid chambers 99b have inlet sides connected to discharge sides of the ink-jet heads 51 to 58.

The ink supply unit 97 includes an ink tank 100. The ink tank 100 is connected to an inlet side of an ink pump 102 via a valve 101. The ink pump 102 has an ejection side connected to an inlet side of the liquid chamber 99a via a filter 103. The liquid chamber 99b has a discharge side connected to the valve 101. The ink tank for the ink-jet heads 54 to 57 (ink tank for the color ink) have a capacity that is smaller than that of the ink tank 100 for the ink-jet heads 51 to 53 and 58 (an ink tank for the supporting ink, an ink tank for forming-purpose ink, and an ink tank for the clear ink). For example, the capacity of the ink tank 100 for the ink-jet heads 54 to 57 is 1 liter, whereas the capacity of the ink tank 100 for the ink-jet heads 51 to 53 and 58 is 3.5 liters.

The air controller 98 includes an upstream-side pressure pump 105 and a downstream-side pressure pump 106. The pressure pump 105 has an ejection side connected to the liquid chamber 99a via the air chamber 107, valves 108 to 110, and a filter 111. An air chamber 115 is connected to the inlet side of the pressure pump 105 and to the valve 109, The air chamber 116 is connected to the inlet side of the pressure pump 106 and to a valve 112 via a valve 117. Air passages between the pressure pump 105 and the valves 108 and 112 has positive pressure. An air passage between the pressure pump 105 and the valve 109 and an air passage between the pressure pump 106 and the valve 117 each have negative pressure.

The ink collection mechanism 96 includes a waste liquid tank 120, liquid supply pumps 122 and 123, and a vacuum pump 124. The liquid supply pump 122 has an inlet side connected to the cap 94 and has an ejection side connected to the liquid supply pump 122. The waste liquid buffer 121 is connected to the ink collecting units 72 and 93 via a valve 125. The liquid supply pump 123 has an inlet side connected to the waste liquid buffer 121 via a valve 126, and has an ejection side connected to the waste liquid tank 120. The waste liquid buffer 121 is connected to the vacuum pump 124.

Main Effects of the Present Embodiment

In the present embodiment described above, the flattening roller 61 is lifted and lowered with the eccentric cam 76 causing the roller holding member 73 to swing between the contact position 73A, at which the flattening roller 61 can be in contact with the surface of the ink layer, and the retracted position 73B, at which the flattening roller 61 is retracted to be more on the upward side than the surface of the ink layer. This configuration according to the present embodiment ensures smoother lifting and lowering of the flattening roller 61, compared with a configuration employing components such as a solenoid and a lead screw to lift and lower the flattening roller 61 linearly in the upward and downward direction. In the present embodiment, the eccentric cam 76 causes the roller holding member 73 to swing, whereby the flattening roller 61 is lifted or lowered. This enables high speed lifting and lowering of the flattening roller 61 without compromising the smoothness of the lifting and lowering movement. Thus, in the present embodiment, the flattening roller 61 can be smoothly lifted and lowered at high speed.

In the present embodiment, the bearings 82 are attached to the roller holding member 73 to support both side ends of the flattening roller 61. Thus, the present embodiment ensures no rattling or reduced rattling between the roller holding member 73 and the flattening roller 61. Thus, the present embodiment enables the flattening roller 61 to flatten the surface of the ink layer with vibration with respect to the roller holding member 73 reduced or prevented. In the present embodiment, the stopper members 86 and 87 stop the roller holding member 73 at the contact position 73A with rattling between the roller holding member 73 and the flattening roller 61 reduced or prevented. This ensures the flattening roller 61 to be repeatedly positioned accurately at the lowered position.

As described above, the present embodiment ensures reduction or prevention of vibration of the flattening roller 61, with respect to the roller holding member 73, in the process of flattening the surface of a layer of ink, and also ensures the flattening roller 61 to be repeatedly positioned accurately at the lowered position. This ensures accurate flattening of the surface of the ink layer by the flattening roller 61.

In the present embodiment, the flattening roller 61 is disposed more on the downward side than the support shaft 74. The stopper members 86 and 87 are disposed more on the upward side than the support shaft 74. In the present embodiment, the roller holding member 73 is disposed at the retracted position 73B when the carriage 5 moves toward the left side from the home position. The roller holding member 73 is disposed at the contact position 73A when the carriage 5 moves toward the right side. In the present disclosure, the stopper member 86 is in contact with the stopper member 87 from the left side, when the roller holding member 73 is at the contact position 73A. Thus, in the present embodiment, the stopper members 86 and 87 can receive counterforce acting on the left side of the flattening roller 61 in the process of flattening the surface of a layer of ink with the carriage 5 moved toward the right side. Thus, the present embodiment ensures a lower risk of the flattening roller 61, in the process of flattening the surface of the ink layer, being displaced in the rightward or the leftward direction. This ensures accurate flattening of the surface of the ink layer by the flattening roller 61.

In the present embodiment, the flattening roller 61 is disposed at a position immediately below the support shaft 74 when the roller holding member 73 is at the contact position 73A. Thus, the roller holding member 73 is less likely to swing about the support shaft 74 when upward counter force acts on the flattening roller 61 in the process of flattening the surface of a layer of ink. The roller holding member 73 might be slightly displaced from the contact position 73A while the surface of the ink layer is being flattened, due to the wearing of the stopper members 86 and 87. The present embodiment ensures a smaller displacement amount of the position of the flattening roller 61 in the upward and downward direction in such a situation. In the present embodiment, the flattening roller 61 is disposed at the position immediately below the support shaft 74 when the roller holding member 73 is at the contact position 73A. This ensures a large swinging amount of the flattening roller 61 (that is, a large swinging amount of the holding member 73) relative to the lowered or lifted amount of the flattening roller 61.

In the present embodiment, the movement of the roller holding member 73 from the contact position 73A to the retracted position 73B causes the flattening roller 61 to move away from the ultraviolet light emitter 60 disposed at the left end of the ejection unit 48. Thus, in the present embodiment, even in a state where the ultraviolet light emitter 60 disposed at the left end of the ejection unit 48 and the flattening roller 61 are disposed adjacent to each other in the rightward and leftward direction, the ultraviolet light emitter 60 emits ultraviolet light onto the ink on the upper surface of the table 2 when the roller holding member 73 is at the retracted position 73B. This configuration ensures a lower risk of the ultraviolet light emitted from the ultraviolet light emitter 60 being blocked by the flattening roller 61.

Other Embodiments

In the embodiment described above, the eccentric cam 76 and the motor 77 form the swing mechanism that makes the roller holding member 73 swing. Other non-limiting examples of the swing mechanism that makes the roller holding member 73 swing include a solenoid and a crank mechanism.

The platform 26, in the embodiment described above, may have a lower surface (back surface) provided with a reinforcement rib 26c having a lattice or a honeycomb structure. This configuration ensures sufficient strength of the platform 26 with a small thickness at portions where the rib 26c is not formed. This ensures the platform 26 to have a lighter weight without having the strength compromised. Such a platform 26 is easily detachable from the platform holding member 27. The platform 26, which is detachably attached to the platform holding member 27 in the embodiment described above, may also be integrally formed with the platform holding member 27 or may be secured to the platform holding member 27 by welding or the like.

The platform 26, which is secured on the platform holding member 27 with the screws 30 in the embodiment described above, may not be secured to the platform holding member 27. Specifically, a plurality of positioning pins protruding upward may be formed or secured on the placement surface of the side member 28, and through holes for receiving the positioning pins may be formed in the platform 26 for example. Thus, the platform 26 is placed on the placement surface with the positioning pins inserted in the through holes. This configuration enables a three-dimensional object that has been completed to be taken out from the three-dimensional object production apparatus 1 as follows. Specifically, a robot may detach the platform 26 from the platform holding member 27 of the table 2 that has moved to the forward end, so that the three-dimensional object is taken out together with the platform 26. Then, for example, the robot conveys the platform 26 detached from the platform holding member 27 (the platform 26 with the three-dimensional object) to a predetermined shelf, and then convey and attach the empty platform 26, from the predetermined shelf, to the platform holding member 27.

Figure 12:
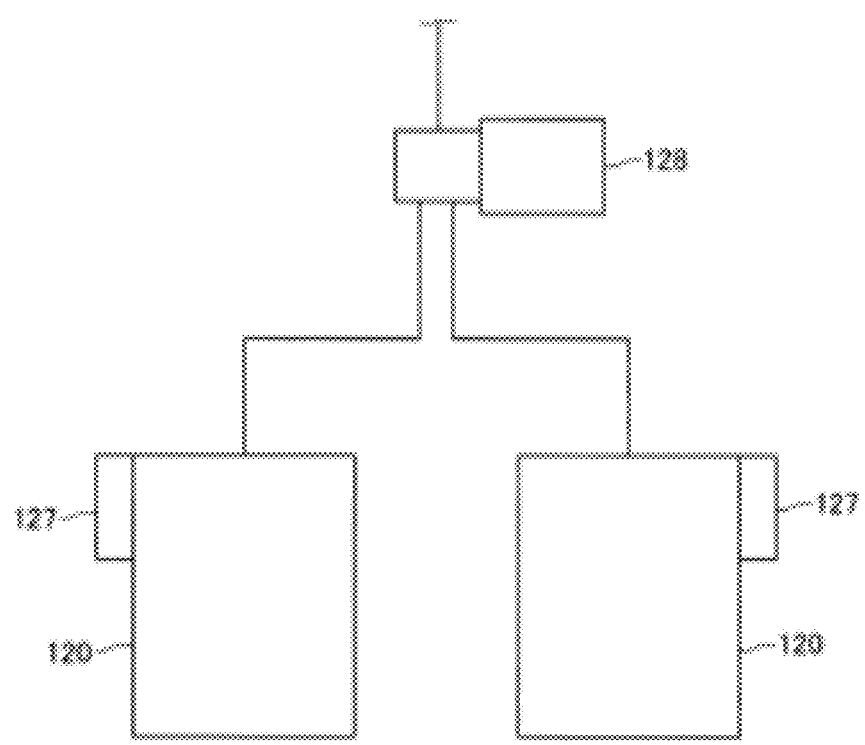
FIG. 12 is a block diagram illustrating a configuration of an ink collection mechanism according to an alternative embodiment of present disclosure.

The ink collection mechanism 96 in the embodiment described above may include a plurality of the waste liquid tanks 120. For example, the ink collection mechanism 96 may include two waste liquid tanks 120 as illustrated in FIG. 12. In this configuration, an ink amount detection mechanism 127 is attached to each of the two waste liquid tanks 120 to detect the remaining amount of ink in a corresponding one of the waste liquid tanks 120. Furthermore, in this configuration, a switching valve 128 is disposed between the two waste liquid tanks 120 and the liquid supply pumps 122 and 123. The switching valve 128 is a solenoid valve connected to each of the two waste liquid tanks 120 via a pipe.

In this configuration, ink is collected in one of the waste liquid tank 120 with the liquid supply pumps 122 and 123 connected to the waste liquid tank 120 via the switching valve 128. When the ink amount detection mechanism 127, attached to the waste liquid tank 120, detects that a predetermined amount of ink is in the waste liquid tank 120, the switching valve 128 switches an ink collection passage so that the ink is collected in the other waste liquid tank 120. Specifically, the switching valve 128 switches the ink collection passage so that the liquid supply pumps 122 and 123 are connected to the other waste liquid tank 120.

In this configuration where the ink collection mechanism 96 includes the two waste liquid tanks 120, the switching valve 128 switches the ink collection passage based on a result of the detection by the ink amount detection mechanism 127, so that the ink is collected in one of the two waste liquid tanks 120. The ink collection mechanism 96 may include three or more waste liquid tanks 120. In such a configuration, the switching valve 128 switches the ink collection passage based on a result of the detection by the ink amount detection mechanism 127, so that the ink is collected in one of three or more waste liquid tanks 120.

The bearing 82, which is a rolling bearing in the embodiment described above, may be a slide bearing. In the embodiment described above, the flattening roller 61 has both side ends rotatably held by the roller holding member 73 via the bearings 82. Alternatively, the roller holding member 73 may directly rotatably hold both side ends of the flattening roller 61. The stopper member 86, formed separately from the roller holding member 73 and secured to the roller holding member 73 in the embodiment described above, may be formed integrally with the roller holding member 73. Similarly, the stopper member 87, formed separately from the holding frame 75 and secured to the holding frame 75, may be integrally formed with the holding frame 75.

In the embodiment described above, the flattening roller 61 is at the position immediately below the support shaft 74 when the roller holding member 73 is at the contact position 73A. Alternatively, the flattening roller 61 may be disposed at a position shifted from the position immediately below the support shaft 74 when the roller holding member 73 is at the contact position 73A. In the embodiment described above, the movement of the roller holding member 73 from the contact position 73A to the retracted position 73B causes the flattening roller 61 to move away from the ultraviolet light emitter 60 disposed at the left end of the ejection unit 48. Alternatively, the movement of the roller holding member 73 from the contact position 73A to the retracted position 73B may cause the flattening roller 61 to move toward the ultraviolet light emitter 60 disposed at the left end of the ejection unit 48.

In the embodiment described above, the stage 3 may include three or more lifting-lowering mechanisms that lift and lower the table 2. In this configuration, the following processes may be performed before a three-dimensional object is produced. Specifically, the laser range finder 49 may measure the distance between each of a plurality of portions on the upper surface of the table 2 and the laser range finder 49 in the upward and downward direction. Then, the three or more lifting-lowering mechanisms may each independently lift or lower the table 2 based on a result of the measurement by the laser range finder 49 to adjust an inclination of the upper surface of the table 2 (that is, the upper surface of the platform 26) relative to a horizontal plane.

1 . . . three-dimensional object production apparatus, 2 . . . table, 5 . . . carriage, 7 . . . carriage drive mechanism, 51 to 58 . . . ink-jet head, 60 . . . ultraviolet light emitter, 61 . . . flattening roller, 69 . . . roller lifting-lowering mechanism, 73 . . . roller holding member, 73A . . . contact position, 73B . . . retracted position, 74 . . . support shaft, 75 . . . holding frame, 76 . . . eccentric cam (part of swing mechanism), 77 . . . motor (part of swing mechanism), 82 . . . bearing, 86 . . . stopper member (movable side stopper member), 87 . . . stopper member (fixed side stopper member), X . . . main scanning direction, X1 . . . first direction side, X2 . . . second direction side, Y . . . sub-scanning direction

What is claimed is:

1. A three-dimensional object production apparatus comprising:
    a table on which a three-dimensional object is formed;
    an ink-jet head configured to eject ink droplets toward the table;
    a flattening roller configured to flatten a surface of a layer of the ink ejected from the ink-jet head;
    a carriage configured to carry the ink-jet head and the flattening roller; and
    a roller lifting-lowering mechanism that is carried on the carriage and configured to lift and lower the flattening roller toward and from the carriage; and
    an eccentric cam that is in contact with a roller holding member,
    wherein the roller holding member comprises a support shaft between the flattening roller and the eccentric cam configured to swingably support the roller holding member,
    the roller lifting-lowering mechanism is configured to cause the roller holding member to swing between a contact position and a retracted position by moving the roller holding member downwardly due to rotation of the eccentric cam and moving the roller holding member about the support shaft, the flattening roller being able to contact the surface of the layer of the ink when the roller holding member is at the contact position, the flattening roller being retracted to be more on an upward side than the surface of the layer of the ink when the roller holding member is at the retracted position,
    the roller lifting-lowering mechanism comprises the support shaft configured to swingably support the roller holding member, and a holding frame configured to hold the support shaft, and
    the flattening roller, the roller lifting-lowering mechanism, the roller holding member, the support shaft, and the eccentric cam are disposed within the carriage.

2. The three-dimensional object production apparatus according to claim 1, wherein the swing mechanism comprises
    a motor configured to rotate the eccentric cam.

3. The three-dimensional object production apparatus according to claim 1, wherein bearings are attached to the roller holding member to support both side ends of the flattening roller.

4. A three-dimensional object production apparatus comprising:
    a table on which a three-dimensional object is formed;
    an ink-jet head configured to eject ink droplets toward the table;
    a flattening roller configured to flatten a surface of a layer of the ink ejected from the ink-jet head;
    a carriage configured to carry the ink-jet head and the flattening roller;
    a roller lifting-lowering mechanism that is carried on the carriage and configured to lift and lower the flattening roller toward and from the carriage; and
    a carriage drive mechanism configured to move the carriage in a main scanning direction that is one direction in a horizontal direction,
    wherein the roller lifting-lowering mechanism comprises
        a roller holding member configured to rotatably hold the flattening roller, and
        a swing mechanism configured to cause the roller holding member to swing between a contact position and a retracted position, the flattening roller being able to contact the surface of the layer of the ink when the roller holding member is at the contact position, the flattening roller being retracted to be more on an upward side than the surface of the layer of the ink when the roller holding member is at the retracted position, wherein the roller lifting-lowering mechanism comprises
a support shaft configured to swingably support the roller holding member, and
a holding frame configured to hold the support shaft,
wherein the support shaft is disposed to have an axial direction matching a sub-scanning direction, and
wherein the flattening roller is disposed to have an axial direction matching the sub-scanning direction and is disposed at a position immediately below the support shaft when the roller holding member is at the contact position.

5. The three-dimensional object production apparatus according to claim 1, wherein the roller lifting-lowering mechanism includes a stopper member configured to stop the roller holding member at the contact position.

6. A three-dimensional object production apparatus comprising:
a table on which a three-dimensional object is formed;
an ink-jet head configured to eject ink droplets toward the table;
a flattening roller configured to flatten a surface of a layer of the ink ejected from the ink-jet head;
a carriage configured to carry the ink-jet head and the flattening roller;
a roller lifting-lowering mechanism that is carried on the carriage and configured to lift and lower the flattening roller toward and from the carriage, and
a carriage drive mechanism configured to move the carriage in a main scanning direction that is one direction in a horizontal direction;
wherein the roller lifting-lowering mechanism comprises
a roller holding member configured to rotatably hold the flattening roller, and
a swing mechanism configured to cause the roller holding member to swing between a contact position and a retracted position, the flattening roller being able to contact the surface of the layer of the ink when the roller holding member is at the contact position, the flattening roller being retracted to be more on an upward side than the surface of the layer of the ink when the roller holding member is at the retracted position,
wherein the roller lifting-lowering mechanism includes a stopper member configured to stop the roller holding member at the contact position,
wherein the roller lifting-lowering mechanism comprises
a support shaft configured to swingably support the roller holding member, and
a holding frame configured to hold the support shaft,
wherein the stopper member comprises
a movable side stopper member secured to the roller holding member, and
a fixed side stopper member secured to the holding frame,
wherein the support shaft is disposed to have an axial direction matching a sub-scanning direction, and
wherein the flattening roller is disposed to have an axial direction matching the sub-scanning direction and is disposed at a position more on a downward side than the support shaft,
wherein the movable side stopper member and the fixed side stopper member are disposed more on an upward side than the support shaft, and
wherein the roller holding member is disposed at the contact position as a result of movement of the carriage toward a first direction side and is disposed at the retracted position as a result of movement of the carriage toward a second direction side, and the movable side stopper member is in contact with the fixed side stopper member from the second direction side when the roller holding member is at the contact position, the first direction side being one side of the main scanning direction, the second direction side being a side opposite to the first direction side.

7. The three-dimensional object production apparatus according to claim 1, further comprising:
a carriage drive mechanism configured to move the carriage in a main scanning direction that is one direction in a horizontal direction; and
an ultraviolet light emitter configured to cure ultraviolet curable ink ejected from the ink-jet head,
wherein the ultraviolet light emitter is carried in the carriage while being adjacent to the flattening roller in a main scanning direction, and
wherein the flattening roller moves away from the ultraviolet light emitter when the roller holding member moves from the contact position to the retracted position.

8. The three-dimensional object production apparatus according to claim 2, wherein bearings are attached to the roller holding member to support both side ends of the flattening roller.

9. The three-dimensional object production apparatus according to claim 2, further comprising a carriage drive mechanism configured to move the carriage in a main scanning direction that is one direction in a horizontal direction,
wherein the support shaft is disposed to have an axial direction matching a sub-scanning direction, and
wherein the flattening roller is disposed to have an axial direction matching the sub-scanning direction and is disposed at a position immediately below the support shaft when the roller holding member is at the contact position.

10. The three-dimensional object production apparatus according to claim 3, further comprising a carriage drive mechanism configured to move the carriage in a main scanning direction that is one direction in a horizontal direction,
wherein the support shaft is disposed to have an axial direction matching a sub-scanning direction, and
wherein the flattening roller is disposed to have an axial direction matching the sub-scanning direction and is disposed at a position immediately below the support shaft when the roller holding member is at the contact position.

11. The three-dimensional object production apparatus according to claim 2, wherein the roller lifting-lowering mechanism includes a stopper member configured to stop the roller holding member at the contact position.

12. The three-dimensional object production apparatus according to claim 3, wherein the roller lifting-lowering mechanism includes a stopper member configured to stop the roller holding member at the contact position.

13. The three-dimensional object production apparatus according to claim 4, wherein the roller lifting-lowering mechanism includes a stopper member configured to stop the roller holding member at the contact position.

14. The three-dimensional object production apparatus according to claim 11, further comprising a carriage drive mechanism configured to move the carriage in a main scanning direction that is one direction in a horizontal direction;

wherein the stopper member comprises
> a movable side stopper member secured to the roller holding member, and
> a fixed side stopper member secured to the holding frame, wherein the support shaft is disposed to have an axial direction matching a sub-scanning direction, and wherein the flattening roller is disposed to have an axial direction matching the sub-scanning direction and is disposed at a position more on a downward side than the support shaft, wherein the movable side stopper member and the fixed side stopper member are disposed more on an upward side than the support shaft, and wherein the roller holding member is disposed at the contact position as a result of movement of the carriage toward a first direction side and is disposed at the retracted position as a result of movement of the carriage toward a second direction side, and the movable side stopper member is in contact with the fixed side stopper member from the second direction side when the roller holding member is at the contact position, the first direction side being one side of the main scanning direction, the second direction side being a side opposite to the first direction side.

15. The three-dimensional object production apparatus according to claim 12, further comprising a carriage drive mechanism configured to move the carriage in a main scanning direction that is one direction in a horizontal direction;
> wherein the stopper member comprises
>> a movable side stopper member secured to the roller holding member, and
>> a fixed side stopper member secured to the holding frame,
>
> wherein the support shaft is disposed to have an axial direction matching a sub-scanning direction, and
>
> wherein the flattening roller is disposed to have an axial direction matching the sub-scanning direction and is disposed at a position more on a downward side than the support shaft,
>
> wherein the movable side stopper member and the fixed side stopper member are disposed more on an upward side than the support shaft, and
>
> wherein the roller holding member is disposed at the contact position as a result of movement of the carriage toward a first direction side and is disposed at the retracted position as a result of movement of the carriage toward a second direction side, and the movable side stopper member is in contact with the fixed side stopper member from the second direction side when the roller holding member is at the contact position, the first direction side being one side of the main scanning direction, the second direction side being a side opposite to the first direction side.

16. The three-dimensional object production apparatus according to claim 13, further comprising a carriage drive mechanism configured to move the carriage in a main scanning direction that is one direction in a horizontal direction;
> wherein the stopper member comprises
>> a movable side stopper member secured to the roller holding member, and
>> a fixed side stopper member secured to the holding frame,
>
> wherein the support shaft is disposed to have an axial direction matching a sub-scanning direction, and
>
> wherein the flattening roller is disposed to have an axial direction matching the sub-scanning direction and is disposed at a position more on a downward side than the support shaft,
>
> wherein the movable side stopper member and the fixed side stopper member are disposed more on an upward side than the support shaft, and
>
> wherein the roller holding member is disposed at the contact position as a result of movement of the carriage toward a first direction side and is disposed at the retracted position as a result of movement of the carriage toward a second direction side, and the movable side stopper member is in contact with the fixed side stopper member from the second direction side when the roller holding member is at the contact position, the first direction side being one side of the main scanning direction, the second direction side being a side opposite to the first direction side.

17. The three-dimensional object production apparatus according to claim 2, further comprising:
> a carriage drive mechanism configured to move the carriage in a main scanning direction that is one direction in a horizontal direction; and
> an ultraviolet light emitter configured to cure ultraviolet curable ink ejected from the ink-jet head,
> wherein the ultraviolet light emitter is carried in the carriage while being adjacent to the flattening roller in a main scanning direction, and
> wherein the flattening roller moves away from the ultraviolet light emitter when the roller holding member moves from the contact position to the retracted position.

18. The three-dimensional object production apparatus according to claim 3, further comprising:
> a carriage drive mechanism configured to move the carriage in a main scanning direction that is one direction in a horizontal direction; and
> an ultraviolet light emitter configured to cure ultraviolet curable ink ejected from the ink-jet head,
> wherein the ultraviolet light emitter is carried in the carriage while being adjacent to the flattening roller in a main scanning direction, and
> wherein the flattening roller moves away from the ultraviolet light emitter when the roller holding member moves from the contact position to the retracted position.

19. The three-dimensional object production apparatus according to claim 4, further comprising:
> a carriage drive mechanism configured to move the carriage in a main scanning direction that is one direction in a horizontal direction; and
> an ultraviolet light emitter configured to cure ultraviolet curable ink ejected from the ink-jet head,
> wherein the ultraviolet light emitter is carried in the carriage while being adjacent to the flattening roller in a main scanning direction, and
> wherein the flattening roller moves away from the ultraviolet light emitter when the roller holding member moves from the contact position to the retracted position.

20. The three-dimensional object production apparatus according to claim 5, further comprising:
> a carriage drive mechanism configured to move the carriage in a main scanning direction that is one direction in a horizontal direction; and
> an ultraviolet light emitter configured to cure ultraviolet curable ink ejected from the ink-jet head, wherein the ultraviolet light emitter is carried in the carriage while being adjacent to the flattening roller in a main scanning direction, and wherein the flattening roller moves away from the ultraviolet light emitter when the roller holding member moves from the contact position to the retracted position.

\* \* \* \* \*